(12) United States Patent
Peterson et al.

(10) Patent No.: US 8,249,444 B2
(45) Date of Patent: *Aug. 21, 2012

(54) COVERT CAMERA WITH A FIXED LENS

(75) Inventors: Ericka A. Peterson, Lonsdale, MN (US); Richard A. Schwartz, Faribault, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,036

(22) Filed: Sep. 23, 2011

(65) Prior Publication Data

US 2012/0013739 A1   Jan. 19, 2012

Related U.S. Application Data

(62) Division of application No. 12/242,253, filed on Sep. 30, 2008, now Pat. No. 8,050,551.

(51) Int. Cl.
G03B 29/00 (2006.01)

(52) U.S. Cl. ......... 396/433; 396/428; 348/151; 348/155

(58) Field of Classification Search ............... 396/427, 396/428, 433; 348/151, 156, 155
See application file for complete search history.

(56) References Cited

U.S. PATENT DOCUMENTS

| | | | |
|---|---|---|---|
| 4,803,557 A | 2/1989 | Bridges | |
| D305,420 S | 1/1990 | Bujak | |
| D399,495 S | 10/1998 | Bachschmid | |
| 5,867,099 A | 2/1999 | Keeter | |
| 5,969,760 A * | 10/1999 | Ernest et al. | 348/357 |
| 6,023,061 A * | 2/2000 | Bodkin | 250/332 |
| 6,072,529 A | 6/2000 | Mutze | |
| 6,097,300 A | 8/2000 | Wei | |
| 6,285,287 B1 | 9/2001 | Jones | |
| 6,316,778 B1 | 11/2001 | Goodman | |
| 6,696,957 B2 | 2/2004 | Shepher | |
| 6,705,774 B2 * | 3/2004 | Tashiro et al. | 396/427 |
| 6,834,162 B1 | 12/2004 | Schnell | |
| 6,834,758 B2 | 12/2004 | Nguyen | |
| 6,867,702 B2 | 3/2005 | Huber | |
| 7,003,374 B2 | 2/2006 | Olin | |

(Continued)

FOREIGN PATENT DOCUMENTS

WO    9906275 A1    2/1999

(Continued)

OTHER PUBLICATIONS

Official Action (EP App. No. 09007891.6), dated Jul. 20, 2010.
Supplementary European Search Report (EP 09007891.6), mailed Aug. 26, 2009.

(Continued)

*Primary Examiner* — Clayton E Laballe
*Assistant Examiner* — Warren Fenwick
(74) *Attorney, Agent, or Firm* — Womble Carlyle Sandridge & Rice, LLP

(57) ABSTRACT

A covert camera for surveillance in an aircraft comprises a front panel that can have an appearance other than a conventional camera. The front panel can include at least one aperture therethrough. A lens can be in or near the aperture, the lens having a field of view. A camera mount can be positioned on the front panel. The camera mount can include a sensor capable of receiving an image of at least a portion of the field of view. The camera mount can be capable of adjustment without movement of the lens.

15 Claims, 11 Drawing Sheets

U.S. PATENT DOCUMENTS

| | | | |
|---|---|---|---|
| 7,011,460 B1 * | 3/2006 | Todd et al. | 396/427 |
| 7,198,227 B2 | 4/2007 | Olin | |
| 7,199,543 B1 | 4/2007 | Hettwer | |
| 7,265,670 B2 | 9/2007 | Pantus | |
| D563,331 S | 3/2008 | Rosen | |
| 7,459,672 B2 | 12/2008 | Jensen | |
| 7,500,794 B1 * | 3/2009 | Clark | 396/427 |
| 7,692,719 B2 * | 4/2010 | Kim | 348/373 |
| 7,811,010 B2 * | 10/2010 | Yamashita | 396/427 |
| 2003/0137426 A1 | 7/2003 | Anthony et al. | |
| 2004/0109059 A1 * | 6/2004 | Kawakita | 348/143 |
| 2004/0227815 A1 * | 11/2004 | Chen | 348/151 |
| 2004/0251384 A1 | 12/2004 | Sprenger | |
| 2005/0053113 A1 * | 3/2005 | Clary et al. | 372/108 |
| 2006/0268435 A1 * | 11/2006 | Finizio et al. | 359/819 |
| 2007/0172227 A1 * | 7/2007 | Droege et al. | 396/419 |
| 2007/0241897 A1 | 10/2007 | Knuepfer | |
| 2007/0291115 A1 * | 12/2007 | Bachelder et al. | 348/143 |
| 2008/0143836 A1 * | 6/2008 | Nowicki et al. | 348/151 |
| 2010/0080548 A1 * | 4/2010 | Peterson et al. | 396/153 |
| 2010/0220192 A1 * | 9/2010 | Cirker | 348/151 |

FOREIGN PATENT DOCUMENTS

| | | |
|---|---|---|
| WO | 03047240 A | 6/2003 |
| WO | 03105480 A1 | 12/2003 |
| WO | 2005056350 A1 | 6/2005 |

OTHER PUBLICATIONS

Search and Examination Report (GB 0721612.0), Feb. 22, 2008, pp. 1-4.
Search and Examination Report (GB 0721612.0), Aug. 8, 2008, pp. 1-2.
Cabin Video Surveillance and Visual Awareness System Overview, ASG, Inc., Sep. 26, 2006, pp. 1-23.
In-Flight Video Security Systems, Goodrich Corporation, Aug. 2003, p. 1.
Sensor Systems—MFD Video System, Goodrich Corporation, May 2006, pp. 1-2.
Sensor Systems—Electronic Flight Bag System, Goodrich Corporation, May 2006, pp. 1-4.
Sensor Systems—EFB Video System, Goodrich Corporation, May 2006, pp. 1-2.
Sensor Systems—Video Surveillance Systems, Goodrich Corporation, May 2006, pp. 1-4.

* cited by examiner

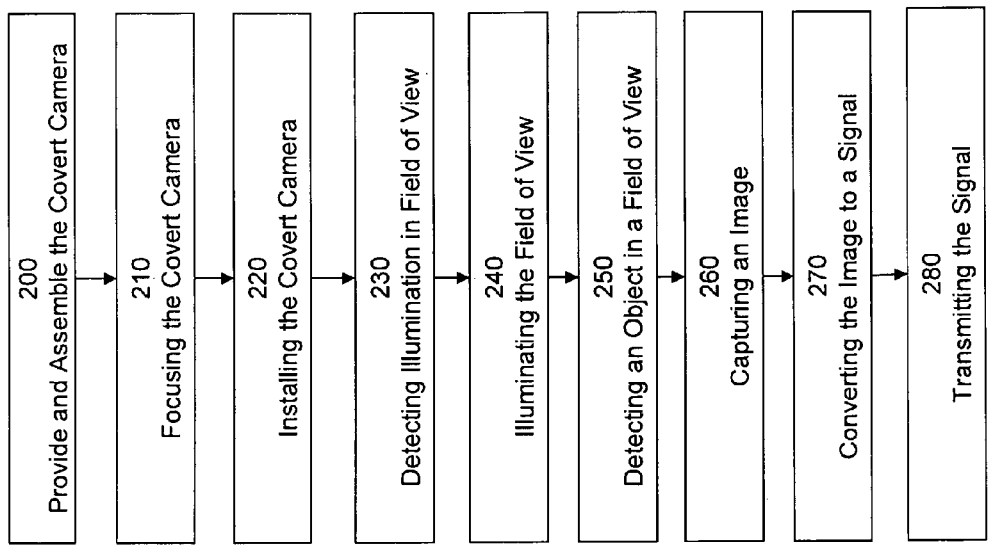

COVERT CAMERA WITH A FIXED LENS

RELATED APPLICATIONS

This application is a divisional of U.S. application Ser. No. 12/242,253, filed Sep. 30, 2008 now U.S. Pat. No. 8,050,551, the content of which is incorporated by reference in its entirety.

FIELD OF THE INVENTION

The present invention generally relates to a camera for covert surveillance on an aircraft, and in particular to a covert camera having a fixed lens for use in the interior of an aircraft.

BACKGROUND

Surveillance cameras can help detect and deter theft and unwarranted trespass to secure areas of an aircraft, including cargo areas. Preferably, such cameras operate in extreme low light or no light situations and accomplish their surveillance goals in such a manner so as to discourage tampering or attempts to disable the camera equipment.

Cameras used in aircraft can be subjected to extreme environmental conditions. Vibration, temperature fluctuations, potential shock, fluctuating lighting conditions, are just a few environmental conditions to consider. See, e.g., the international standard for environmental testing of commercial avionics as set forth in RTCA/DO-160F, *Environmental Conditions and Test Procedures for Airborne Equipment*. Equipment designers must account for such conditions, as well as with the added goal of minimizing equipment costs, size, power and weight for all airborne equipment and avionics.

Traditional cameras have an optical element, or lens, placed a certain distance from a sensor. The image is focused by adjusting the position of the lens in relation to the sensor. The focal length, the lens type, clarity and type of image to be captured impact the design of the camera. This focusing configuration can impact the overall cost and size of a camera and limit the volume in which a camera can be placed.

In view of the above goals and requirements, there is a need for a small profile camera that can be used effectively and efficiently for covert surveillance in an aircraft environment.

SUMMARY

A covert camera for surveillance in an aircraft comprises a front panel that can have an appearance other than a conventional camera. The front panel can include at least one aperture therethrough. A lens can be in or near the aperture, the lens having a field of view. A camera mount can be positioned on the front panel. The camera mount can include a sensor capable of receiving an image of at least a portion of the field of view. The camera mount can be capable of adjustment without movement of the lens.

The foregoing and other features, aspects and advantages of the invention will be apparent from a reading of the following detailed description together with the accompanying drawings, which are described below.

BRIEF DESCRIPTION OF THE DRAWINGS

FIG. 10 shows method of using a covert camera.

DETAILED DESCRIPTION

Certain exemplary embodiments of the present invention are described below and illustrated in the accompanying Figures. The embodiments described are only for purposes of illustrating embodiments of the present invention and should not be interpreted as limiting the scope of the invention. Other embodiments of the invention, and certain modifications and improvements of the described embodiments, will occur to those of skill in the art, and all such alternate embodiments, modifications and improvements are within the scope of the present invention.

Figure 1:
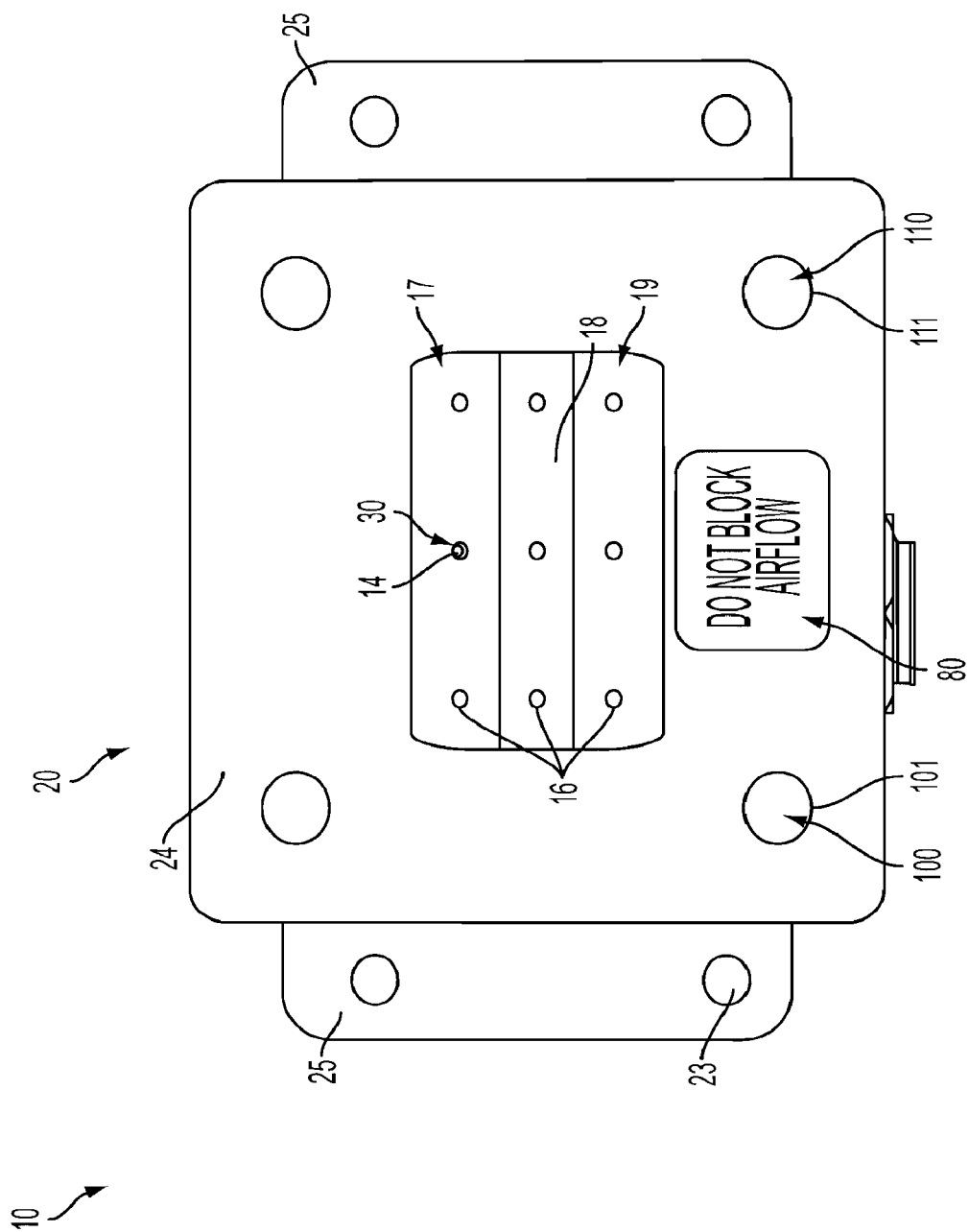
FIG. 1 is a front elevation view of a covert camera.

FIG. 1 shows a front panel 20 of an embodiment of camera 10 suitable for installation in an aircraft. Front panel 20 includes a plurality of distraction holes 16. Lens 30 in this embodiment is positioned in aperture 14, providing an appearance similar to a distraction hole 16. Front panel 20 has an appearance other than a conventional camera. A conventional camera, as used herein, refers to a camera that can be identified as a camera by a majority of observers. While the shape shown in FIG. 1 could appear to be an environmental sensor, the front panel 20 could have a profile similar to components found in an aircraft, such as a thermostat, circuit breaker, communications panel, fire or smoke detector, or other equipment.

Lens 30 can have an external visible area on the front panel 20 of about 0.09-in (2.23-mm). In alternate embodiments, the visible area can be less than 0.09-inches (2.23-mm). For example, the visible area can be as small as about 0.039 in (1-mm). In other embodiments the visible area can be more than 0.09-in (2.23-mm).

Front panel 20 as shown has a flat portion 24 and a raised portion 18 that contains the distraction holes 16 and aperture 14. The raised portion 18 has angled portions 17 and 19. FIG. 1 shows lens 30 at aperture 14 in angled portion 17. In alternate embodiments, however, the lens can be placed at other locations depending upon desired installation height or position, and the preferred orientation for observing the desired field of view.

In addition to housing a lens 30, the front panel 20 can house additional avionics that are part of a covert surveillance system. For example, front panel 20 as shown also has an infrared light 80, motion sensor 100 and light sensor 110, as will be described below.

Flanges 25 can be used to secure front panel 20 to a location in the aircraft. Mounting holes 23 allow for attachment of the front panel and related components on a desired portion of an aircraft.

Figure 2:
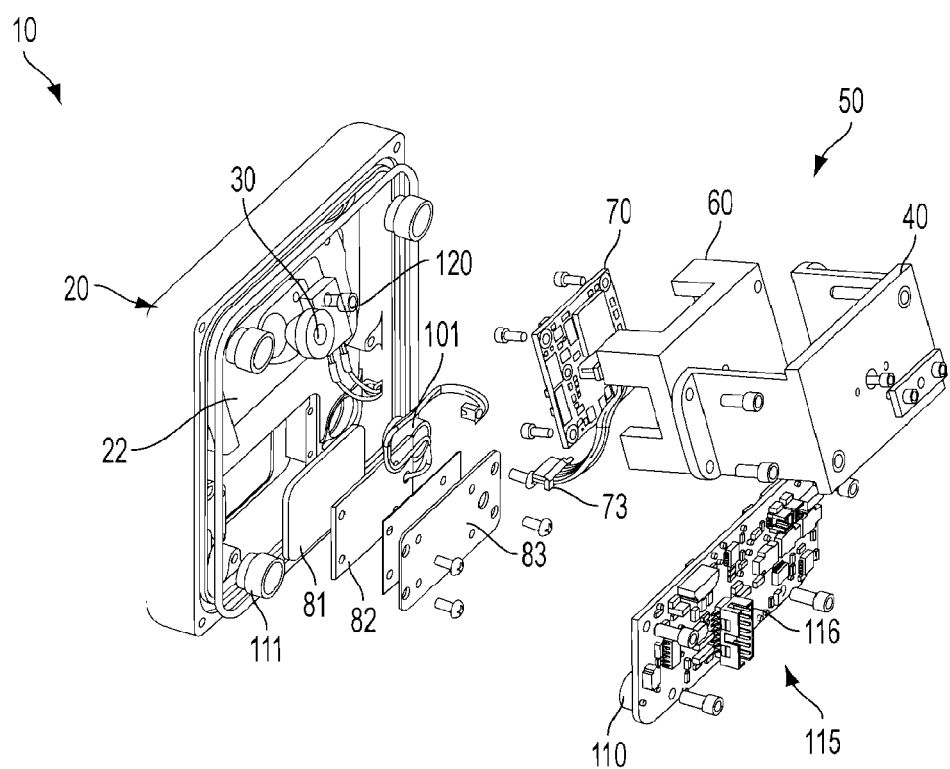
FIG. 2 is an exploded assembly view of the side a covert camera.

FIG. 2 is an exploded assembly view of camera 10, showing the front panel 20, lens 30, and various components mounted in this embodiment on the backside 22 of the front panel 20. Camera mount 50 includes both a housing 40 and board mount 60. Housing 40 receives board mount 60 and camera board 70. Lens 30 directs light from a field of view towards camera board 70.

Lens 30 in a preferred embodiment is a conical lens having low light capability with an F-number of 2 (i.e. a F2 rating). F-rating, or F-number, refers to the ratio of focal length to the lens aperture diameter and relates to the brightness of an image formed by a particular lens. In alternate embodiments, however, lens 30 can have any F-rating. For example, lens 30 can have an F1, F1.1, F1.5 or any incremental F-rating. Lens 30 can be plastic, polymeric, glass or other material, as is known in the art. In other alternate embodiments, a simple or compound lens can be used. In a preferred embodiment, lens 30 is stationary during camera adjustment.

Figure 3:
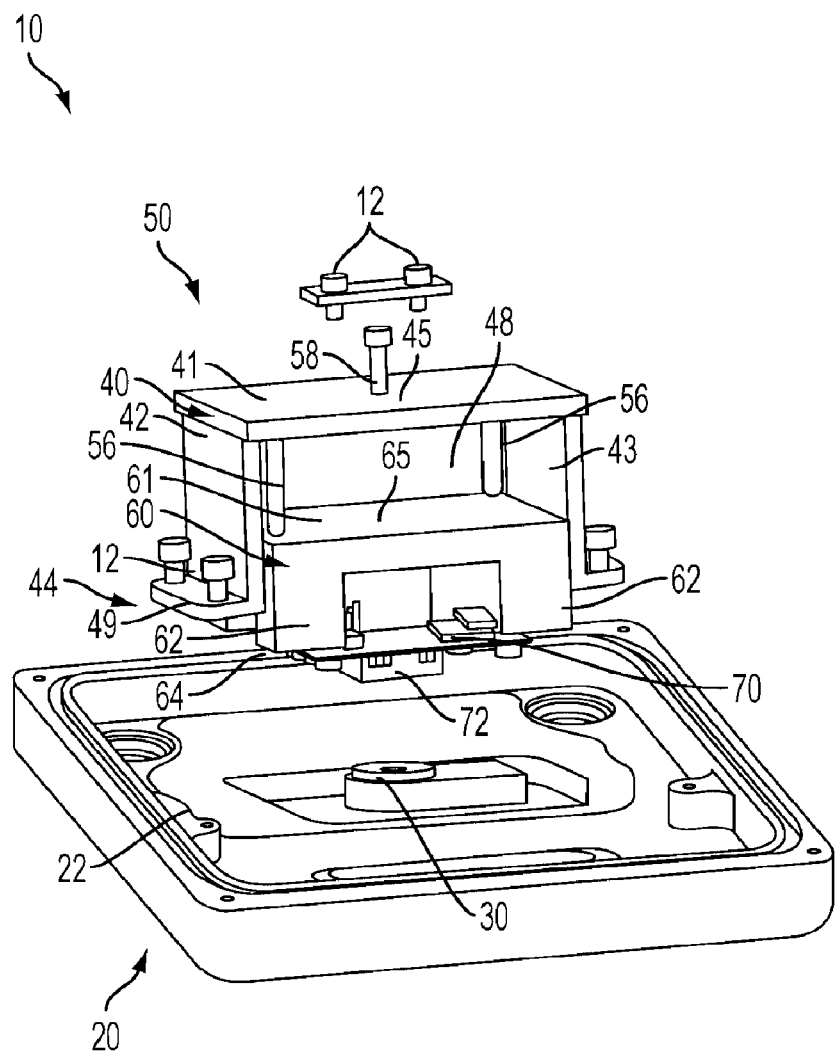
FIG. 3 is a bottom perspective exploded view of a covert camera.

FIG. 3 is another exploded view of an embodiment of camera 10 and related components. Sensor 72, which is shown mounted on camera board 70, receives an image through lens 30 when assembled. Sensor 72 digitizes the image into a signal for storage or transmittal to server 4, using processing methods as is known in the art. In alternate embodiments, camera board 70 can also have a processor 74 that transmits a converted signal to a server 4. In alternate embodiments, however, a signal can be transmitted to another location using a satellite communication system, as is known in the art. Sensor 72 can be a charged couple device (CCD), available from Videology Imaging Solutions, Inc., of Greeneville, R. I. In alternate embodiments, sensor 72 can be a complementary metal-oxide-semiconductor (CMOS), or other sensors capable of converting an image into an electronic signal.

Figure 4:
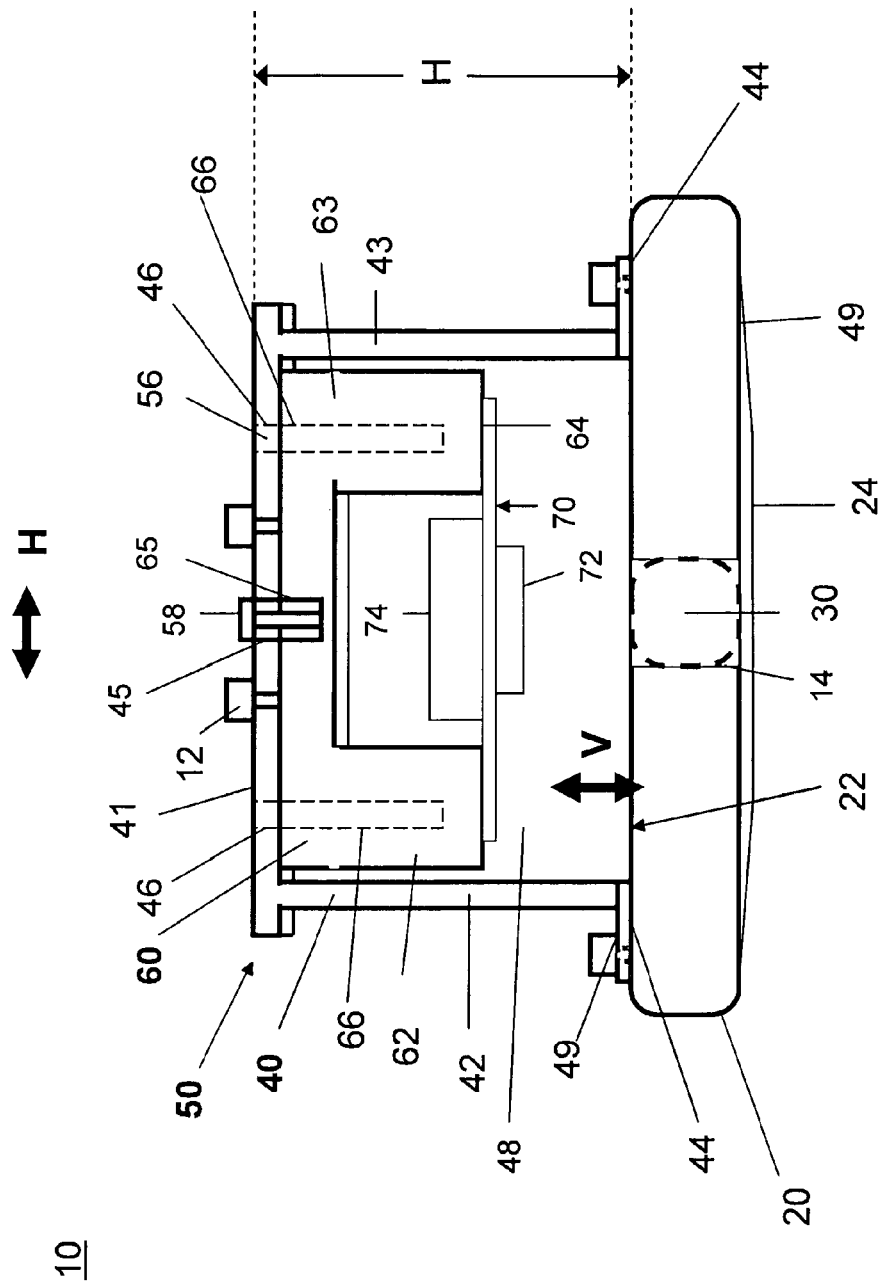
FIG. 4 is a bottom side view of a covert camera.

As further shown in FIGS. 3 and 4, housing 40 has a top 41, first side 42, second side 43 and a base 44. First and second sides 42 and 43 can extend downwardly from top 41 to form an interior 48. Board mount 60 is positioned within interior 48. First and second sides 42 and 43 extend to a ledge 49, which can be mounted to the front panel 20 through mechanical or other types of fasteners. Housing 40 can have an inverted "U" shape. In alternate embodiments, housing 40 can have a single side, or an inverted "L" shape. Top 41 can be supported through other elements, e.g., bolts, rods, pins, etc. Top 41, first and second sides 42, 43 and base 44 can be separately manufactured and assembled, or integrally formed.

Camera mount 50 can be designed to fit within small and confined spaces in an aircraft. In an embodiment shown in FIG. 4, the height, H, of camera mount 50, measured from base 44 to top 41 can be about 1.7 in (43.22 mm). In alternate embodiments, the height, H, of first and second sides 42 and 43 can be less than 1.7 inches (43.22 mm), depending on the desired or required focus distance.

Board mount 60 can have a top 61, sides 62, and a bottom 64. In the embodiment shown, camera board 70 is secured to bottom 64. Board mount 60 is translatably connected to housing 40 through a focusing screw 58 and alignment pins 56. Housing 40 and board mount 60 can have corresponding first and second alignment openings, 46 and 66, respectively. In the embodiment shown, alignment pins 56 engage first alignment opening 46 and second alignment opening 66 to position camera board 70 above lens 30.

Lens 30 can be in at least a portion of aperture 14 as shown in FIG. 4. In the embodiment shown, lens 30 is threaded into aperture 14. A threaded sealant can be used to seal lens 30 in aperture 14. A threaded sealant can be sealant tape, silicone, or other material used as a sealant, as in known in art. In alternate embodiments, lens 30 can be positioned atop aperture 14. In other alternate embodiments, lens 30 can be fixed in aperture 14, or fix-mounted on front panel 20 near aperture 14.

Figure 5A:
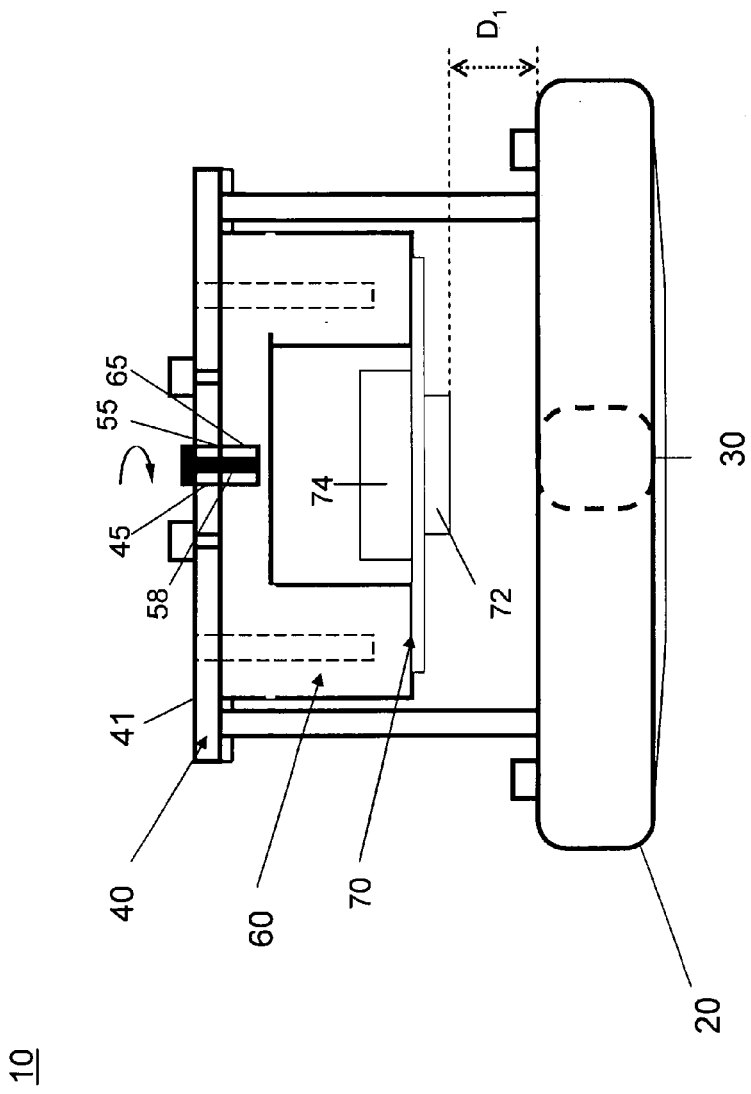
FIGS. 5A and 5B are bottom side views of a covert camera with a camera mount at different positions above a lens.
Figure 5B:
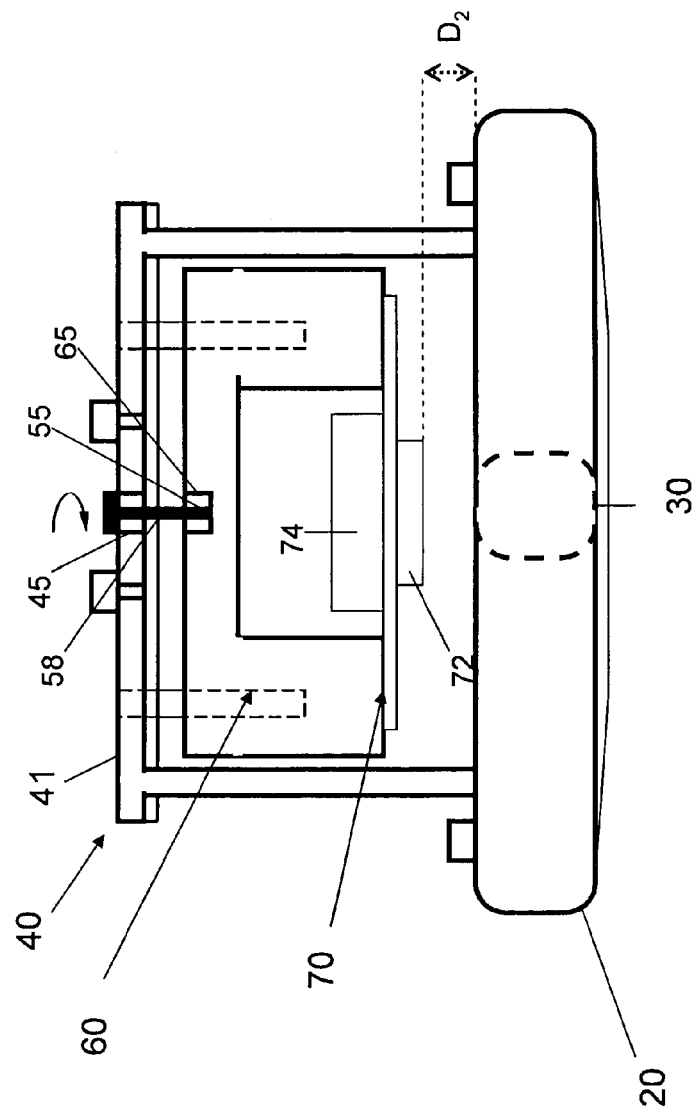

Board mount 60 can adjust vertically and horizontally relative to lens 30. Vertical adjustment refers to movement closer to or further from lens 30, as shown by directional area V in FIG. 4. Horizontal adjustment refers to movement above but parallel to lens 30, as shown by directional area H. Vertical adjustment of board mount 60 can occur through rotation of a focusing screw 58. As shown in FIGS. 5A and 5B, first opening 45, second opening 65 and locking insert 55 can receive focusing screw 58. In one embodiment, first and second openings 45 and 65 can be threaded to receive a focusing screw 58. Focusing screw 58 can be rotated to move board mount 60 within housing 40 away from lens 30, or towards lens 30 in the direction V as needed to focus the desired image of an object in a field of view. Horizontal adjustment in direction H can be achieved by slotting (not shown) the openings in ledges 49 in direction H to allow for horizontal positioning.

In FIG. 5A sensor 72 is located a distance, $D_1$, above lens 30. As shown in FIG. 5B, rotation of focusing screw 58 moves board mount 60 towards lens 30 providing a distance, $D_2$, between sensor 72 and lens 30. Any desired distance between sensor 72 and lens 30 can be achieved to provide the desired focus on an object in a field of view. In an embodiment, camera 10 can be set to focus on an object about 6 ft (1.82-m) from lens 30.

Board mount 60 can be secured in position within housing 40 to maintain focus by using a locking insert 55 as shown in FIG. 5B. A locking insert 55 can fix the vertical position of camera board 70 when an object in a field of view is brought into the desired focus. Locking insert 55 can be a helicoil type insert, as is known in the art. In alternate embodiments, other devices for minimizing the movement of board mount 60 can be used, such as locking nuts and the like, as is known in the art.

Figure 6:
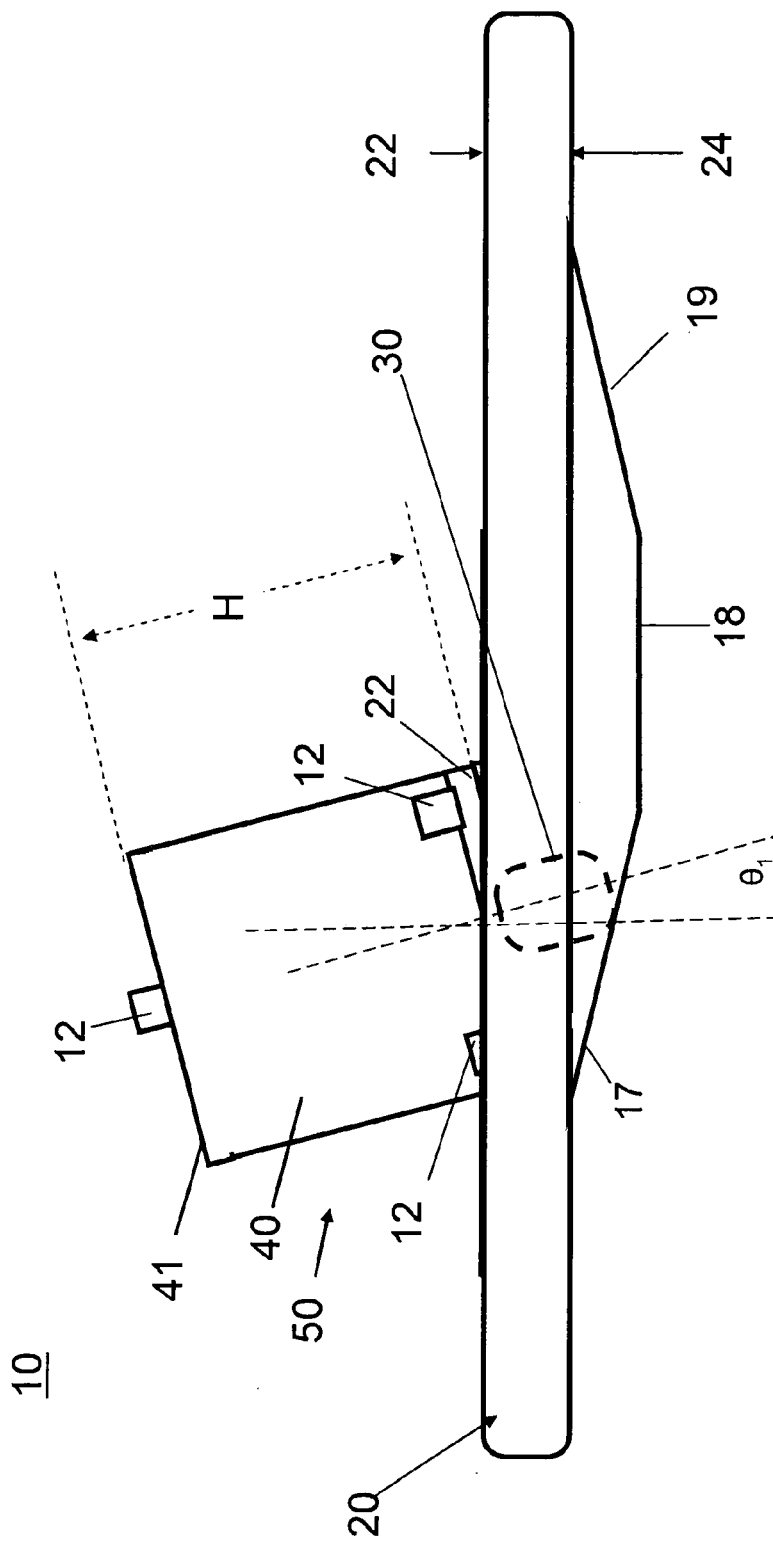
FIG. 6 is a side view of a covert camera.

FIG. 6 illustrates the optional mounting angle of the camera mount 50 to achieve desired fields of view. As shown, housing 40 is positioned proximate to lens 30 at an angle $\theta_1$, where angle $\theta_1$ is measured with respect to a line substantially orthogonal to front panel raised portion 18. A preferred angle to maximize the image view has been found to be approximately 15 degrees, although other angles can be used.

As stated above, additional equipment can work in concert with the lens 30 and sensor 72 to provide a surveillance system. Referring again to FIGS. 1 and 2, fresnel lenses 101 and 111 can cover motion sensor 100 and light sensor 110, respectively. In alternate embodiments, however, lens 101 and 111 can be any type of lens. Light sensor 110 can detect the level of illumination and activate or deactivate an infrared light 80 as needed. In addition, a heater 120, such as an electric resistance heater, can reduce fogging in lens 30, as further described below.

Motion sensor 100 is positioned at or near front panel 20 to detect a pre-selected condition in a field of view. In a preferred embodiment, motion sensor 100 is a passive pyroelectric infrared sensor that detects movement up to about 10-ft (3.08-m) from the lens 30 of camera 10. For example, an infrared source, such as a human body, can enter the field of view and emit infrared energy towards motion sensor 100. A fresnel lens 101 receives the infrared energy, causing the motion sensor 100 to send a detect signal to the server 4. In alternate embodiments, a segmented parabolic mirror can be used to focus infrared energy from an infrared source to motion sensor 100. Other types of lenses, such as simple or compound lenses can be used in conjunction with motion sensor 100. A passive infrared sensor is shown in FIGS. 2 and 3; in alternate embodiments, however, other sensors such as ultrasonic, or microwave sensors can be used for motion detection.

A source of infrared light 80 can be incorporated covertly in the front panel 20 to avoid detection. FIGS. 1 and 2 show an infrared light 80 having a filter 81, LED array 82, and bracket 83. Bracket 83 positions LED array 82 and filter 81 on front panel 20. Filter 81 also covers LED array 82 from detection from the field of view. In the embodiment shown in FIGS. 1 and 2, a placard or LED display can be added to filter 81 so that it appears to be a sign to disguise its true purpose. In an alternate embodiment, filter 81 can have a matted surface finish. In a preferred embodiment, the infrared light source is an 940 nm, 110 degree IR Array LED available from Opto-Diode Corporation of Newbury Park, Calif. This light source has a 110° beam angle operating at a 940 nm wavelength. In alternate embodiments, the beam angle can be less than 110°. Further, infrared LED arrays operating at a wavelength less than 940 nm can be used. In alternate embodiments, however, other methods of illuminating a field of view can be used. For example, thermal sensors can be used in conjunction with camera 10 to detect heat sources, as is known in the art.

Infrared light 80 cooperates with light sensor 110. A light sensor 110 can be positioned in front panel 20 adjacent to a second fresnel lens 111 (see FIG. 1). As the light in a field of view drops below a specified condition, infrared light 80 can be activated to project an infrared spectrum into the field of view. As the level of illumination in the field of view increases above the specified condition, infrared light 80 can be deactivated (thereby saving battery or power requirements) and ambient light or other light illuminates the field of view. For example, any light, such as sunlight or standard aircraft lighting can illuminate the field view engaging the light sensor 110 that causes the deactivation of the infrared light 80.

Figure 7:
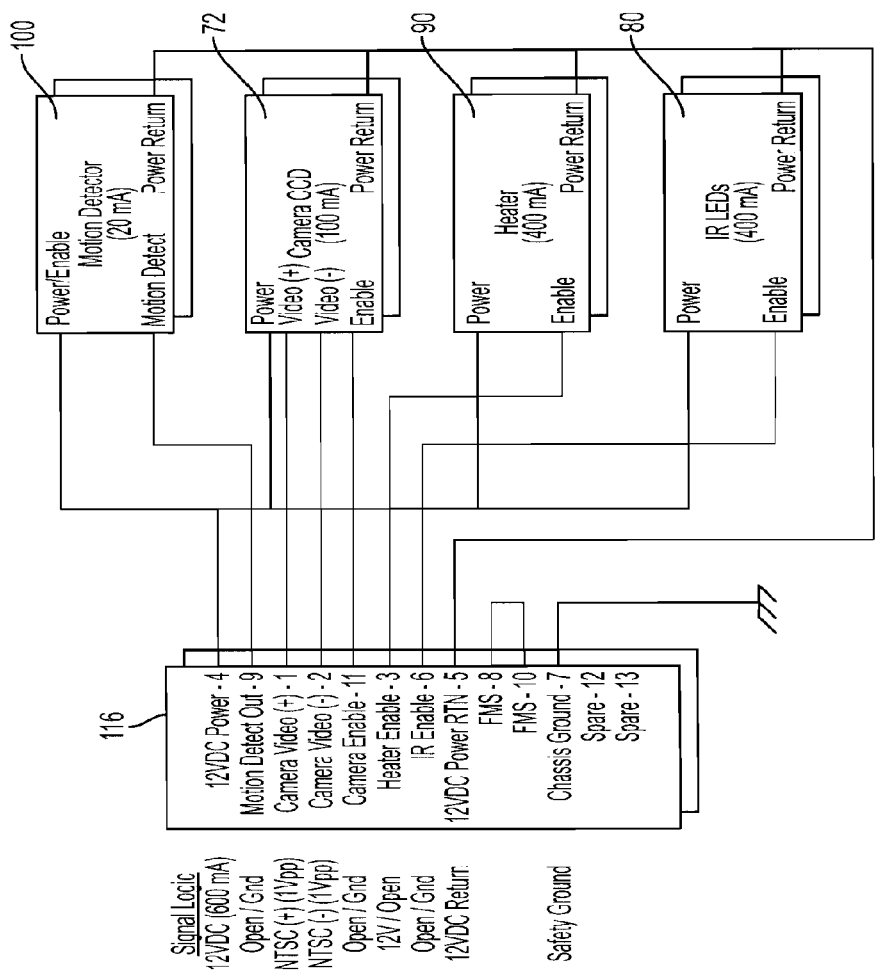
FIGS. 7 and 8 show schematics of an embodiment of a surveillance system.
Figure 8:
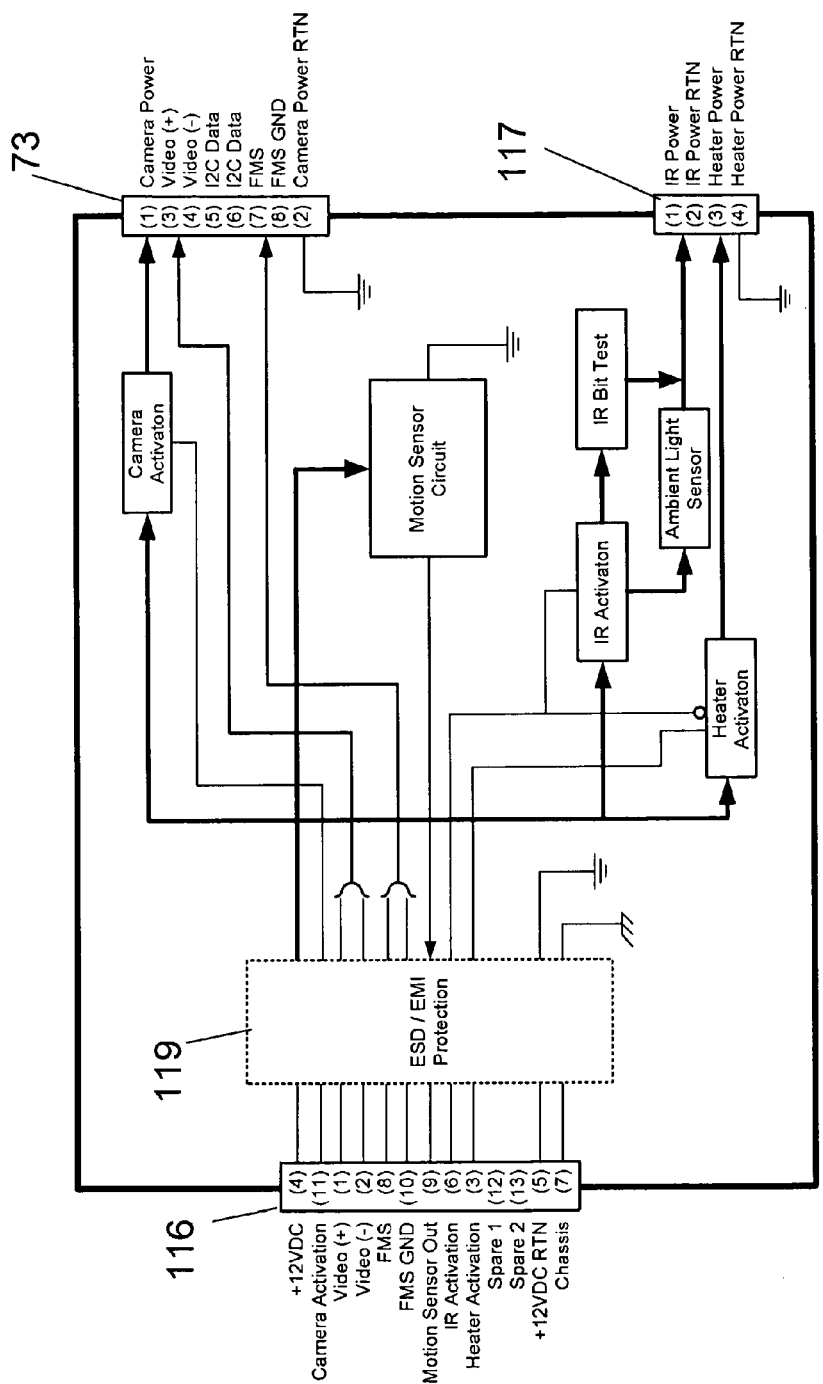

An optional heater 120 also can be located proximate to lens 30. Heater 120 can be activated to reduce fogging in lens 30. Heater 120 can cooperate with infrared light 80 and light sensor 110. When infrared light 80 activates to illuminate the field of view during low light conditions, heater 120 can be deactivated to reduce heat build-up in camera 10 during operation. Also, in some aircraft, simultaneous operating of the heater 120 and infrared light 80 is not possible or desirable due to available electric power FIGS. 7 and 8 illustrate schematic arrangements of an embodiment of the various components of the surveillance system. Motion sensor 100, sensor 72, heater 90, and infrared light 80 are attached to wire-to-wire or wire-to-board connector 116 in the manner shown in FIG. 7. In a preferred embodiment, connector 116 is attached to circuit board 115 (see FIG. 2). In FIG. 8, a wire diagram illustrates further the interrelationship of connectors 73 (as shown in FIG. 2), 116 and 117. Electromagnetic interference and electrostatic discharge protection is provided by filter 119.

Figure 9:
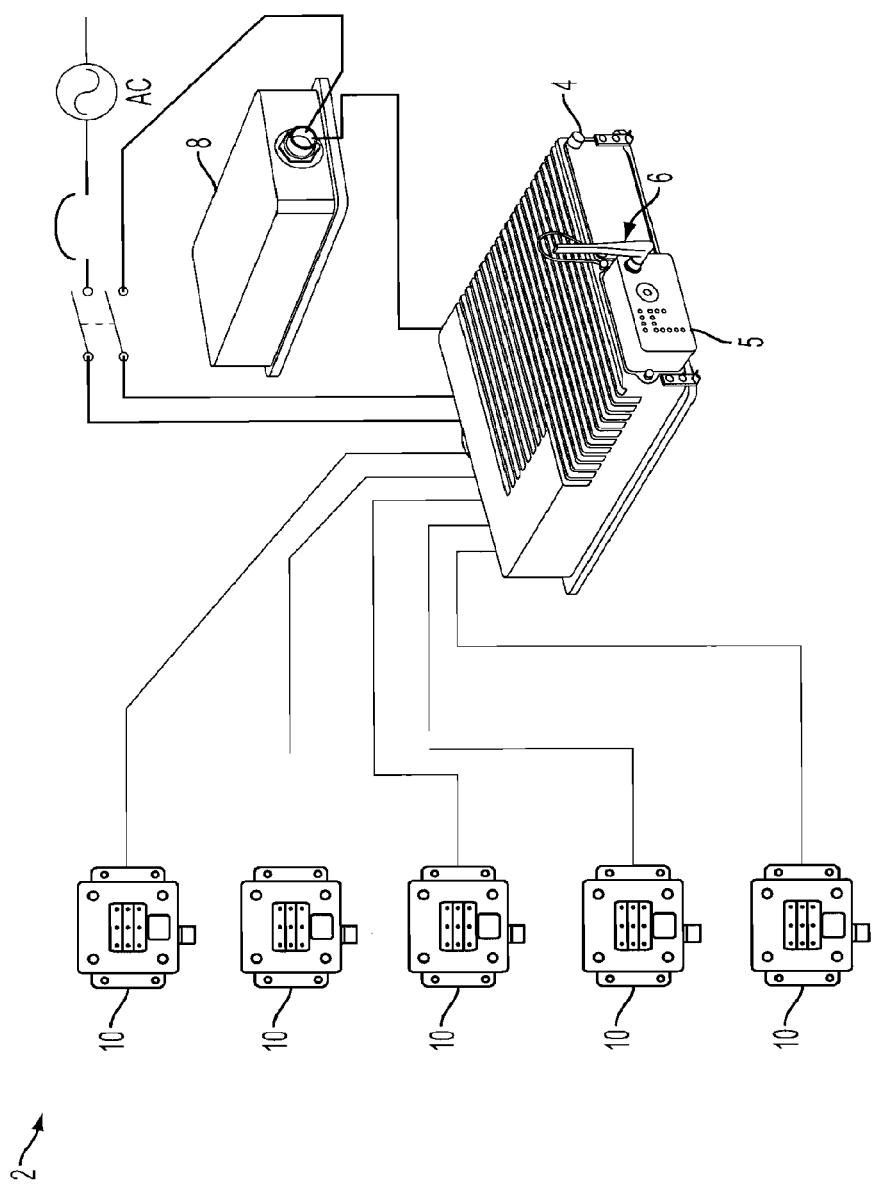
FIG. 9 shows an embodiment of a surveillance system.

FIG. 9 shows an embodiment of a covert surveillance system 2. Five cameras 10 positioned to capture five different fields of view can be linked via wires or wirelessly to a server 4. Server 4 includes a control panel 5 and a wireless antenna 6, capable of receiving a signal from each camera 10. Power is provided by 12 volt DC input from the aircraft, or by battery 8 as needed. Although five (5) cameras are shown, the system can have more or less cameras depending upon the areas of surveillance required. The cameras are intended to consume about 550 mA each, which results in a power usage of less than 7 watts when powered by 12 volt DC source.

The inventors contemplate a method of using a covert surveillance system as shown in FIG. 10. Camera components can be provided and assembled 200 into a camera. The camera can then be focused 210 to provide a sensor at a preferred focus position some distance from a lens. A camera can then be installed 220 in an aircraft. In alternate embodiments, a plurality of cameras can be installed in an aircraft. Further a camera can be installed in cargo compartment, or in the passenger compartment of an aircraft. In other embodiments, a camera can be installed in a cargo aircraft.

Following installation 220, a camera can detect 230 illumination in the field of view. If the level of illumination is below a specified condition, an infrared light can be activated to illuminate 240 the field of view. Conversely, infrared light can be deactivated as the need may arise.

The camera can detect an object or activity 250 within the field of view using a motion sensor described above. Detecting illumination 230 or detecting an object 250 can occur simultaneously, or can occur sequentially as shown. In other alternate embodiments, detecting an object 250 can occur prior to detecting illumination 230 of the field of view. Further detecting step 250 can occur prior to illuminating 240 the field of view.

A sensor can receive and capture 260 an image from the field of view in real time. Thereupon, the image can be converted 270 to a signal and transmitted 280 to a server. In alternate embodiments, the signal can be transmitted, wirelessly to a server, to a control tower, or to a security station on the ground through a satellite communication system The camera can be removed and readjusted to refocus the image as the need may arise. In other embodiments, the camera can be replaced altogether.

The above descriptions of various embodiments of the invention are intended to describe and illustrate various elements and aspects of the invention. Persons of ordinary skill in the art will recognize that certain changes and modifications can be made to the described embodiments without departing from the scope of the invention. All such changes and modifications are intended to be within the scope of the appended claims.

What is claimed is:

1. A method of using at least one covert camera for surveillance in an aircraft comprising:
   (a) providing the covert camera in an interior of the aircraft, the covert camera comprising;
   a front panel having an appearance other than a conventional camera, the front panel having at least one aperture therethrough;
   a lens in or near the aperture, the lens being fixed relative to the front panel and having a field of view;
   a camera mount positioned on the front panel, the camera mount having a sensor capable of receiving an image of at least a portion of the field of view, wherein:
   the camera mount is further capable of adjustment relative to the front panel without movement of the lens relative to the front panel; and
   the sensor moves relative to the lens upon adjustment of the camera mount, while the lens remains fixed relative to the front panel; and
   (b) adjusting the position of the sensor to a preferred focus position.

2. The method of claim 1, further comprising locking the sensor at the preferred focus position.

3. The method of claim 1, further comprising installing the covert camera in the aircraft.

4. The method of claim 1, further comprising receiving an image of at least a portion of the field of view.

5. The method of claim 1, further comprising transmitting the image for use on a display.

6. The method of claim 1, further comprising transmitting the image wirelessly for use on a display.

7. The method of claim 1, the covert camera further comprising a motion sensor in or near the front panel, the motion sensor capable of detecting activity in the field of view.

8. The method of claim 1, the covert camera further comprising an infrared light in or near the front panel, the infrared light capable of illuminating a field of view.

9. The method of claim 1, the covert camera further comprising a light sensor in or near the front panel, the light sensor capable of detecting illumination in the field of view.

10. The method of claim 1, wherein the sensor is a charged couple device.

11. A method using at least one covert camera comprising:
   (a) providing the covert camera, the covert camera comprising;
      a front panel having an appearance other than a conventional camera, the front panel having at least one aperture therethrough,
      a lens in or near the aperture, the lens being fixed relative to the front panel and having a field of view;
      a camera mount positioned on the front panel, the camera mount having a sensor capable of receiving an image of at least a portion of the field of view, wherein:
         the camera mount is further capable of adjusting relative to the front panel without movement of the lens relative to the front panel;
   (b) adjusting the position of the sensor to a preferred focus position;
   (c) installing the covert camera in an aircraft;
   (d) receiving the image of the at least a portion of field of view on the sensor.

12. The method of claim 11, further comprising transmitting the image for use on a display.

13. The method of claim 11, further comprising transmitting the image wirelessly for use on a display.

14. The method of claim 11, further comprising locking the sensor at the preferred focus position.

15. The method of claim 11 wherein the covert camera further comprises:
   a motion sensor in or near the front panel, the motion sensor capable of detecting activity in the field of view;
   an infrared light in or near the front panel, the infrared light capable of illuminating a field of view; and
   a light sensor in or near the front panel, the light sensor capable of detecting illumination in the field of view.

* * * * *